United States Patent
Kerns et al.

(10) Patent No.: US 6,741,918 B2
(45) Date of Patent: May 25, 2004

(54) SYSTEM AND METHOD FOR DETECTION OF DEGRADATION OF VACUUM BRAKE BOOSTER SENSOR

(75) Inventors: James Michael Kerns, Trenton, MI (US); John D. Russell, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 5 days.

(21) Appl. No.: 09/838,799

(22) Filed: Apr. 20, 2001

(65) Prior Publication Data

US 2001/0035166 A1 Nov. 1, 2001

Related U.S. Application Data

(63) Continuation-in-part of application No. 09/479,173, filed on Jan. 7, 2000.

(51) Int. Cl.$^7$ ............................. F02D 9/08; G01L 5/28; B60T 8/32
(52) U.S. Cl. ..................... 701/34; 303/122.03; 73/121
(58) Field of Search ................... 701/34; 303/122.03, 303/122.05, 122.08, 122.09, 10, 113.5, 116.1, 122.11, 122.12, DIG. 4, 114.3; 73/121, 115, 1.66; 123/679, 295, 399, 568.2; 477/203, 206

(56) References Cited

U.S. PATENT DOCUMENTS

| | | | | |
|---|---|---|---|---|
| 4,582,031 A | | 4/1986 | Janetzke et al. | 123/339 |
| 4,907,556 A | | 3/1990 | Ishii et al. | 123/486 |
| 5,540,209 A | * | 7/1996 | Hasegawa et al. | 123/679 |
| 5,554,801 A | * | 9/1996 | Watanabe | 73/115 |
| 5,826,559 A | | 10/1998 | Ichimoto et al. | 123/295 |
| 5,846,164 A | | 12/1998 | Harada | 477/205 |
| 5,915,357 A | | 6/1999 | Harada et al. | 123/399 |
| 5,938,297 A | | 8/1999 | Whaite et al. | 303/114.3 |
| 5,950,594 A | | 9/1999 | Mizuno | 123/295 |
| 5,950,595 A | | 9/1999 | Yoshioka et al. | 123/295 |
| 5,954,406 A | * | 9/1999 | Sawada | 303/122.09 |
| 5,967,628 A | * | 10/1999 | Abe et al. | 303/122.12 |
| 6,062,656 A | * | 5/2000 | Unterforsthuber et al. | 303/122.09 |
| 6,314,733 B1 | * | 11/2001 | Fallahi et al. | 60/598 |
| 6,360,592 B1 | * | 3/2002 | Harris et al. | 73/121 |
| 6,393,345 B1 | | 5/2002 | Kerns et al. | 701/34 |
| 6,398,319 B1 | * | 6/2002 | Wilson et al. | 303/122.03 |
| 6,493,617 B1 | | 12/2002 | Russell et al. | 701/34 |

FOREIGN PATENT DOCUMENTS

| | | |
|---|---|---|
| EP | 0 833 044 | 4/1998 |
| EP | 0 967 131 | 12/1999 |
| EP | 0 990 793 | 4/2000 |
| JP | 8-164840 | 12/1994 |

* cited by examiner

Primary Examiner—Tan Q. Nguyen
Assistant Examiner—Dalena Tran
(74) Attorney, Agent, or Firm—Allan J. Lippa; Kolisch Hartwell, P.C.

(57) ABSTRACT

Systems and methods for detecting degradation of a sensor in a vacuum brake booster coupled to a manifold of an internal combustion engine include measuring an engine or vehicle operating parameter to detect operating or control conditions and detecting degradation of the sensor based on the engine or vehicle operating parameter. In one embodiment the operating parameter is a measured or estimated manifold pressure. A pressure drop across a check valve disposed between the brake booster and the intake manifold may also be considered.

25 Claims, 16 Drawing Sheets

SYSTEM AND METHOD FOR DETECTION OF DEGRADATION OF VACUUM BRAKE BOOSTER SENSOR

CROSS-REFERENCE TO RELATED APPLICATIONS

This application is a continuation-in-part of U.S. application Ser. No. 09/479,173, filed Jan. 7, 2000, titled "Estimation Method", the disclosure of which is hereby incorporated by reference in its entirety.

BACKGROUND OF THE INVENTION

1. Field of the Invention

The field of the invention relates to internal combustion engines having vacuum assisted brake systems.

2. Background Art

Internal combustion engines are known that improve thermal efficiency and reduce pumping work by operating lean of stoichiometry and increasing manifold pressure. It is also known to extend lean operation by performing stratified operation where fuel is injected directly into the engine cylinder during a compression stroke. These engines are also capable of performing homogeneous operation where fuel is injected during an intake, or suction, stroke. Typically, stratified operation is limited to lean air/fuel ratios, while homogeneous operation can be both lean and rich of stoichiometry.

Vehicle brake systems are also known that use vacuum assist to increase driver braking force. In these systems, vacuum generated by engine operation provides extra force to assist driver braking. When these braking systems are combined with lean burn engines, engine operation can be controlled so that desired vacuum is supplied during braking. One approach uses a vacuum pressure sensor located in a brake booster to indicate available braking vacuum. When available vacuum falls below a predetermined value, engine air/fuel ratio is decreased toward stoichiometry and stratified operation is discontinued. Vacuum sensor degradation is determined when sensor voltage is outside a predetermined range of acceptable limits. Such a system is described in U.S. Pat. No. 5,826,559.

The inventors herein have recognized a disadvantage with the above approach. In particular, in-range sensor degradation is not addressed in the above system. For example, if the sensor indicates insufficient vacuum when sufficient vacuum is present, the engine air/fuel ratio is unnecessarily decreased and fuel economy can be degraded. In other words, the prior art does not monitor such a situation.

SUMMARY OF THE INVENTION

An object of the present invention is to determine degradation of a vacuum sensor coupled to a vacuum brake booster.

The above object is achieved and disadvantages of prior approaches overcome by a method for determining operability of a sensor in a vacuum brake booster coupled through a check valve to a manifold of an internal combustion engine, the method comprising: measuring or estimating an engine or vehicle operating parameter; and determining degradation in the brake booster sensor based on said operating parameter.

By using other operating parameters as an indication of operation, it is possible to determine in-range sensor degradation. In other words, system redundancy is exploited to extract information provided by other engine and/or vehicle sensors to determine in-range sensor degradation.

An advantage of the above aspect of the present invention is that improved fuel economy can be achieved by more accurately selecting desired engine combustion modes.

In another aspect of the present invention, the above object is achieved and disadvantes of prior approaches overcome by a method for determining oprability of a sensor in a vacuum brake booster coupled through a check valve to a manifold of an internal combustion engine in a vehicle system, the method comprising: determining that a braking cycle has been completed based on vehicle infomration; and determing degradation in the sensor when the sensor value changes by less than a predetermined amount during said braking cycle.

By using vehicle information to determine a braking cycle, it is possible to determine that brake booster pressure should have changed. When a change is not detected, degradation can be determined. Thus, from the vehicle information, it is possible to determine in-range sensor degradation.

An advantage of the above aspect of the present invention is that improved fuel economy can be achieved by more accurately selecting desired engine combustion modes.

In yet another aspect of the present invention, the above object is achieved and disadvantages of prior approaches overcome by a method for determining operability of a sensor in a brake booster coupled through a check valve to a manifold of an internal combustion engine, the sensor measuring a pressure in the brake booster, the method comprising: calculating a manifold pressure; and determining degradation in the sensor when the brake booster pressure is greater than said manifold pressure by a predetermined amount. By comparing manifold pressure to brake booster pressure, degradation can be determined when brake booster pressure is greater than manifold pressure. In other words, since the check valve prevents flow from entering the brake booster and only allows flow to exit the brake booster when manifold pressure is less than brake booster pressure, when brake booster pressure is indicated to be greater than manifold pressure, in-range sensor degradation can be detected.

An advantage of the above aspect of the present invention is that improved fuel economy can be achieved by more accurately selecting desired engine combustion modes.

Another advantage of the above aspect of the present invention is that degradation can be detected at many times during vehicle operation.

Other objects, features and advantages of the present invention will be readily appreciated by the reader of this specification.

BRIEF DESCRIPTION OF THE DRAWINGS

The object and advantages of the invention claimed herein will be more readily understood by reading an example of an embodiment in which the invention is used to advantage with reference to the following drawings wherein:

FIGS. 2–22 are high level flowcharts and graphs describing a portion of operation of the embodiment shown in FIG. 1.

DETAILED DESCRIPTION OF THE PREFERRED EMBODIMENT(S)

Figure 1:
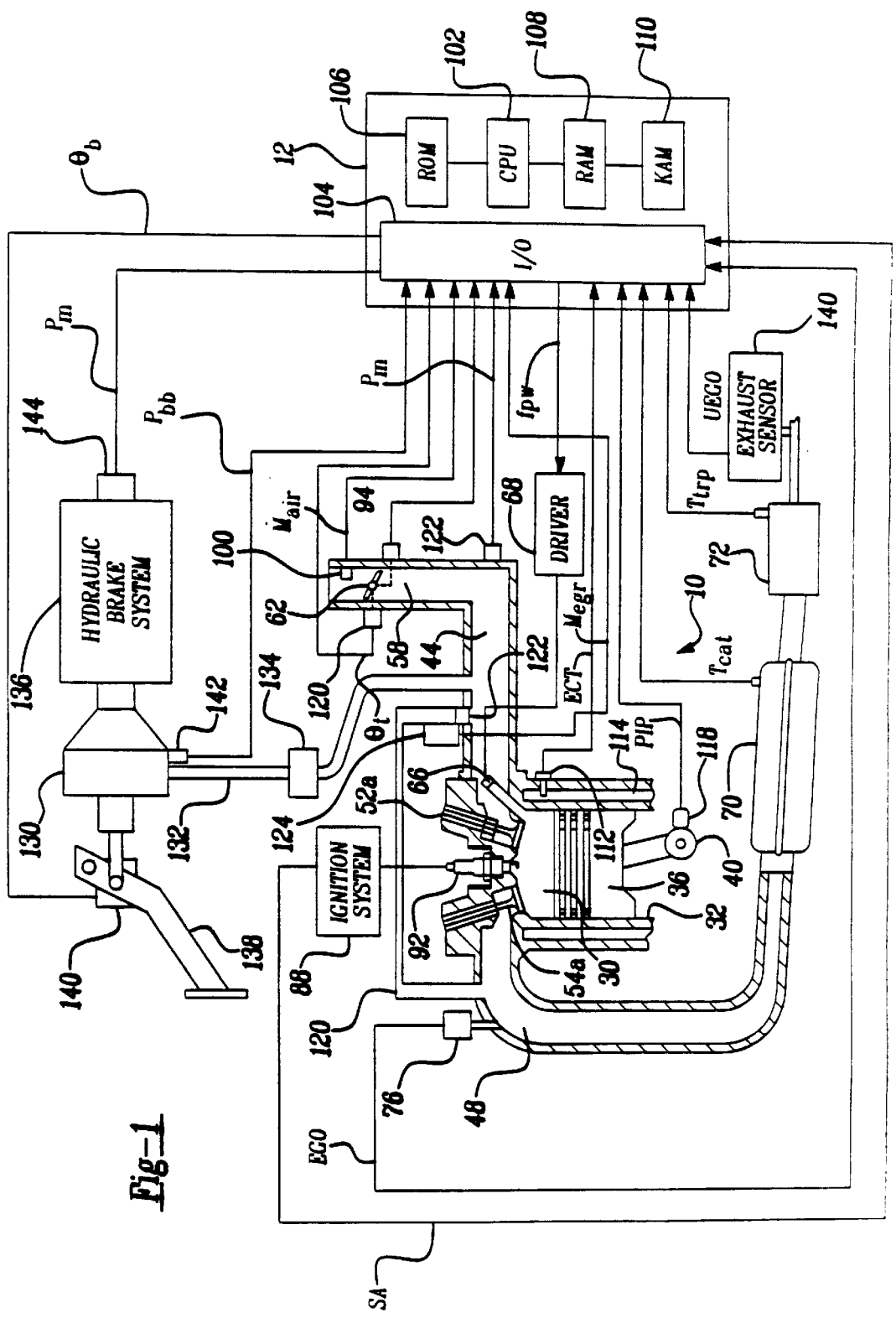
FIG. 1 is a block diagram of an embodiment in which the invention is used to advantage.

Direct injection spark ignited internal combustion engine 10, comprising a plurality of combustion chambers, is controlled by electronic engine controller 12. Combustion chamber 30 of engine 10 is shown in FIG. 1 including combustion chamber walls 32 with piston 36 positioned therein and connected to crankshaft 40. In this particular example, piston 30 includes a recess or bowl (not shown) to help in forming stratified charges of air and fuel. Combustion chamber 30 is shown communicating with intake manifold 44 and exhaust manifold 48 via respective intake valves 52a and 52b (not shown), and exhaust valves 54a and 54b (not shown). Fuel injector 66 is shown directly coupled to combustion chamber 30 for delivering liquid fuel directly therein in proportion to pulse width of signal fpw received from controller 12 via conventional electronic driver 68. Fuel is delivered to fuel injector 66 by a conventional high pressure fuel system (not shown) including a fuel tank, fuel pumps, and a fuel rail.

Intake manifold 44 is shown communicating with throttle body 58 via throttle plate 62. In this particular example, throttle plate 62 is coupled to electric motor 94 so that the position of throttle plate 62 is controlled by controller 12 via electric motor 94. This configuration is commonly referred to as electronic throttle control (ETC) which is also utilized during idle speed control. In an alternative embodiment (not shown), which is well known to those skilled in the art, a bypass air passageway is arranged in parallel with throttle plate 62 to control inducted airflow during idle speed control via a throttle control valve positioned within the air passageway.

Exhaust gas oxygen sensor 76 is shown coupled to exhaust manifold 48 upstream of catalytic converter 70. In this particular example, sensor 76 provides signal UEGO to controller 12 which converts signal UEGO into a relative air/fuel ratio λ. Signal UEGO is used to advantage during feedback air/fuel control in a conventional manner to maintain average air/fuel at a desired air/fuel ratio.

Conventional distributorless ignition system 88 provides ignition spark to combustion chamber 30 via spark plug 92 in response to spark advance signal SA from controller 12.

Controller 12 causes combustion chamber 30 to operate in either a homogeneous air/fuel mode or a stratified air/fuel mode by controlling injection timing. In the stratified mode, controller 12 activates fuel injector 66 during the engine compression stroke so that fuel is sprayed directly into the bowl of piston 36. Stratified air/fuel layers are thereby formed. The stratum closest to the spark plug contains a stoichiometric mixture or a mixture slightly rich of stoichiometry, and subsequent strata contain progressively leaner mixtures. During the homogeneous mode, controller 12 activates fuel injector 66 during the intake stroke so that a substantially homogeneous air/fuel mixture is formed when ignition power is supplied to spark plug 92 by ignition system 88. Controller 12 controls the amount of fuel delivered by fuel injector 66 so that the homogeneous air/fuel mixture in chamber 30 can be selected to be at stoichiometry, a value rich of stoichiometry, or a value lean of stoichiometry. The stratified air/fuel mixture will always be at a value lean of stoichiometry, the exact air/fuel being a function of the amount of fuel delivered to combustion chamber 30. An additional split mode of operation wherein additional fuel is injected during the exhaust stroke while operating in the stratified mode is available. An additional split mode of operation wherein additional fuel is injected during the intake stroke while operating in the stratified mode is also available, where a combined homogeneous and split mode is available.

Nitrogen oxide (NOx) absorbent or trap 72 is shown positioned downstream of catalytic converter 70. NOx trap 72 absorbs NOx when engine 10 is operating lean of stoichiometry. The absorbed NOx is subsequently reacted with HC and catalyzed during a NOx purge cycle when controller 12 causes engine 10 to operate in either a rich homogeneous mode or a stoichiometric homogeneous mode.

Exhaust gas recirculation tube 120 is also shown coupled between intake manifold 44 and exhaust manifold 48. Exhaust gas recirculation valve 122 is placed in exhaust gas recirculation tube 120 to control an amount of recycled exhaust flow. Sensor 124 indicates EGR flow ($\tilde{m}_{egr}$).

Vacuum brake booster 130 is also shown fluidly communicating with manifold 44 via tube 132. Check valve 134 is placed in tube 132 to allow air to pass from vacuum brake booster 130 to manifold 44 only when manifold pressure ($\tilde{p}_m$) is less than brake booster pressure ($\tilde{p}_{bb}$). Thus, check valve 134 allows vacuum to be retained in vacuum brake booster 130 even when manifold pressure ($\tilde{p}_m$) is higher than brake booster pressure ($\tilde{p}_{bb}$). Vacuum brake booster 130 is also coupled to hydraulic brake system 136 and brake pedal 138. Brake pedal position is measured via sensor 140 and provides signal ($\theta_b$), which represents position of brake pedal 138. In this example, sensor 140 provides a continuous signal that allows determination of brake pedal position throughout an entire span. However, sensor 140 can also provide a switch signal that represents when brake pedal 138 has traveled past a predetermined distance. Sensor 142 provides an indication of brake booster pressure ($\tilde{p}_{bb}$). In this example, sensor 142 provides a continuous signal that allows determination of brake booster pressure throughout an entire span. However, sensor 142 can also provide a switch signal asserted when brake booster pressure has reached a predetermined value. Sensor 144 provides an indication of hydraulic brake pressure ($\tilde{p}_h$). In this example, sensor 144 provides a continuous signal that allows determination of hydraulic brake pressure throughout an entire span. However, sensor 144 can also provide a switch signal asserted when hydraulic brake pressure has reached a predetermined value.

Controller 12 is shown in FIG. 1 as a conventional microcomputer including: microprocessor unit 102, input/output ports 104, an electronic storage medium for executable programs and calibration values, shown as read-only memory chip 106 in this particular example, random access memory 108, keep alive memory 110, and a conventional data bus.

Controller 12 is shown receiving various signals from sensors coupled to engine 10, in addition to those signals previously discussed, including: measurement of inducted mass airflow ($\tilde{m}_{air}$) from mass airflow sensor 100 coupled to throttle body 58; engine coolant temperature (ECT) from temperature sensor 112 coupled to cooling sleeve 114; a profile ignition pickup signal (PIP) from Hall effect sensor 118 coupled to crankshaft 40; throttle position ($\theta_t$) from throttle position sensor 120; and absolute Manifold Pressure Signal ($\tilde{p}_m$) from sensor 122. Engine speed signal (N) is generated by controller 12 from signal PIP in a conventional manner, and manifold pressure signal ($\tilde{p}_m$) provides an indication of engine load. Note that the symbol ~ is used to specifically indicate a measured variable when necessary, while the symbol ^ is used to specifically indicate an estimate when necessary. Variables without either signal may represent a measured or estimated value.

In this particular example, temperature Tcat is provided by temperature sensor 124 and temperature Ttrp is provided by temperature sensor 126. However, those skilled in the art will recognize that these values may be estimated rather than measured.

Also, i is an index that occurs at execution of computation loop representing either fixed or variable sample time or engine firings, and k is an index representing driving cycles.

Estimating Brake Booster Pressure From Other Parameters

The following figures describe methods according to the present invention for estimating brake booster pressure based on other parameters.

Figure 2:
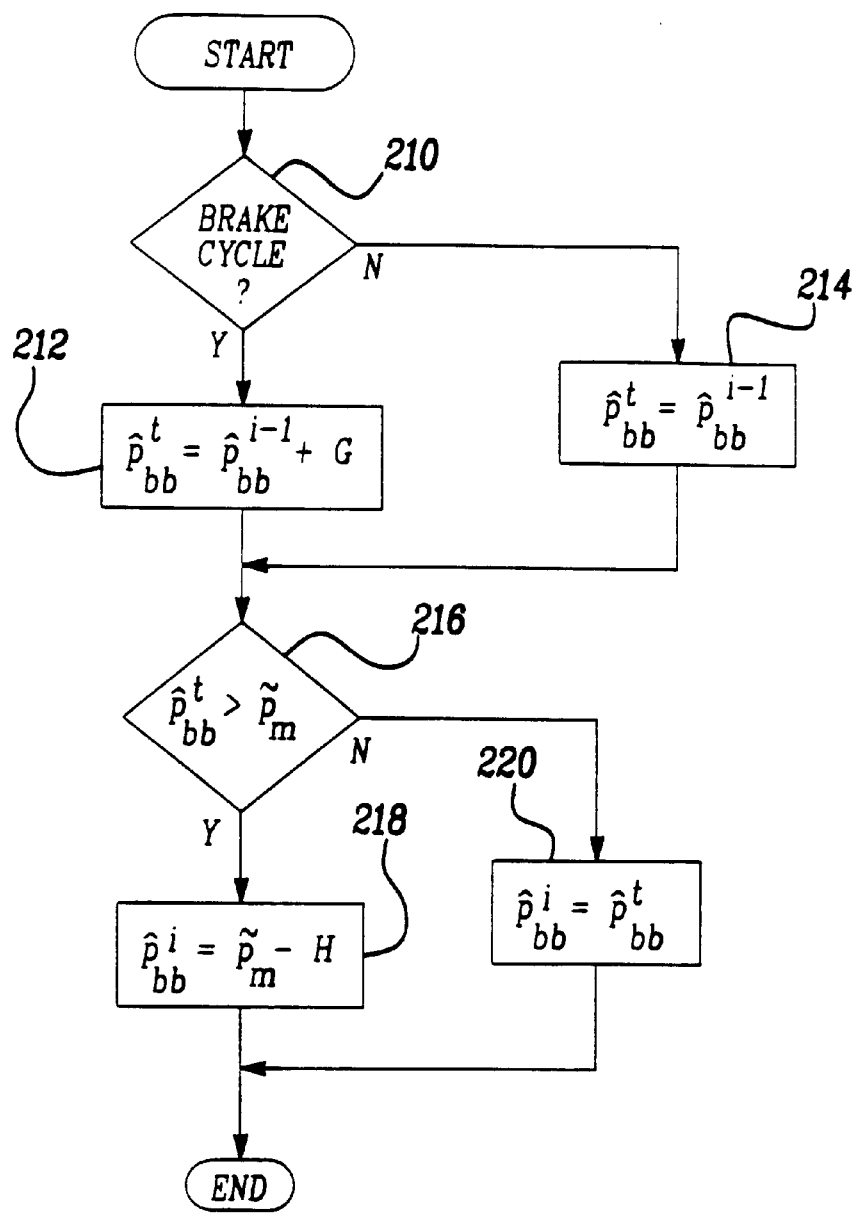

Referring now to FIG. 2, a routine is described for estimating brake booster pressure from measured manifold pressure ($\tilde{p}_m$) and a brake actuation signal. In step 210, a determination is made as to whether a braking cycle has been completed. A braking cycle is determined from brake actuation signal. The brake actuation signal can be generated from brake pedal position ($\theta_b$), or hydraulic brake pressure ($\tilde{p}_h$). In other words, either of these signals can be used to determine when the brakes have been applied and released and an amount of vacuum has been consumed by vacuum brake booster 130. For example, if brake pedal position ($\theta_b$) is a switch, cycling of this switch can be used as an indication that a braking cycle has been detected. Further, if brake pedal position ($\theta_b$) is a continuous signal, when this signal goes back and forth across a certain level, this can be used to indicate that a braking cycle has been detected. Still other methods can be used for determining brake actuation, such as, for example, hydraulic brake pressure, displacement hydraulic braking actuators, or parameters of electric brake actuators.

Continuing with FIG. 2, when a braking cycle has been detected, the routine continues to step 212 where temporary estimated brake booster pressure ($\hat{p}_{bb}^t$) is set equal to previously estimated brake booster pressure ($\hat{p}_{bb}^{i-1}$) and predetermined value G. Predetermined value G represents an amount of vacuum, or pressure, that is used by vacuum brake booster 130 when actuating the braking system. Otherwise, in step 214, temporary estimated brake booster pressure ($\hat{p}_{bb}^t$) is set equal to previously estimated brake booster pressure ($\hat{p}_{bb}^{i-1}$) Next, in step 216, a determination is made as to whether temporary estimated brake booster pressure ($\hat{p}_{bb}^t$) is greater than measured manifold pressure ($\tilde{p}_m$). When the answer to step 216 is YES, current estimated brake booster pressure ($\hat{p}_{bb}^i$) is set equal to measured manifold pressure ($\tilde{p}_m$) minus predetermined value H. Predetermined value H represents the pressure drop across check valve 134. Otherwise, in step 220, the current estimated brake booster pressure ($\hat{p}_{bb}^i$) is set equal to temporary estimated brake booster pressure ($\hat{p}_{bb}^t$). Thus, according to the present invention, it is possible to estimate brake booster pressure using other operating parameters. In particular, by including the pressure drop across the valve, a more accurate estimate is provided.

Figure 3:
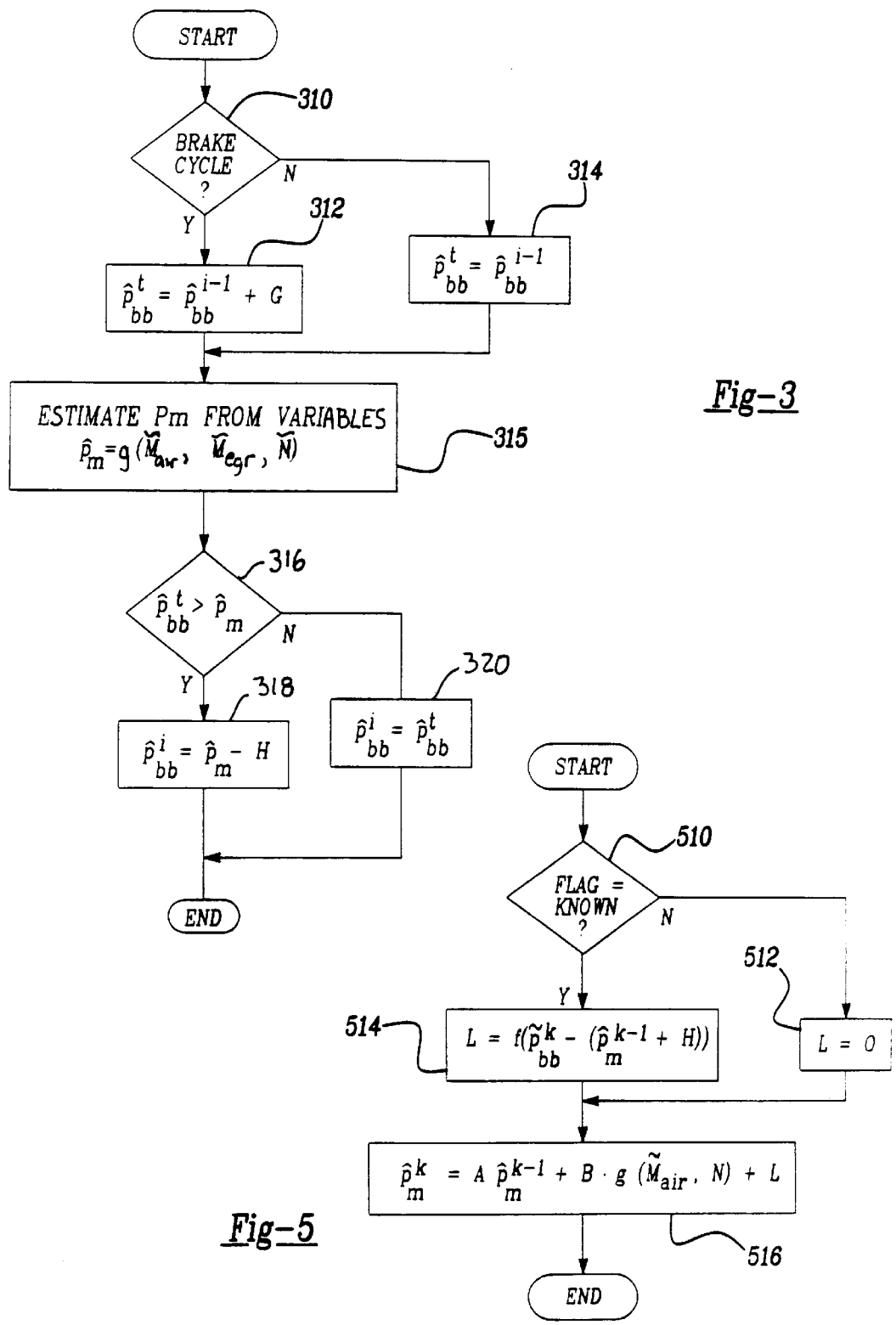

Referring now to FIG. 3, a routine is described for estimating brake booster pressure using braking system parameters and an estimated manifold pressure ($\hat{p}_m$). In step 310, a determination is made as to whether a braking cycle has been completed as described previously with respect to step 210. When a braking cycle has been detected, the routine continues to step 312 where estimated temporary brake booster pressure ($\hat{p}_{bb}^t$) is set equal to the previously estimated brake booster pressure ($\hat{p}_{bb}^{i-1}$) and predetermined value G. Predetermined value G represents an amount of vacuum, or pressure, that is used by vacuum brake booster 130 when actuating the braking system. Otherwise, in step 314, temporary estimated brake booster pressure ($\hat{p}_{bb}^t$) is set equal to the previously estimated brake booster pressure ($\hat{p}_{bb}^{i-1}$). In step 315, manifold pressure is estimated from other engine parameters using function g and parameters: $\tilde{m}_{air}$, $\tilde{m}_{egr}$, and $\tilde{N}$. Those skilled in the art will recognize various other methods for estimating manifold pressure using these or other parameters, including modifications for temperature, heat transfer, and various other corrections.

Next, in step 316, a determination is made as to whether temporary estimated brake booster pressure ($\hat{p}_{bb}^t$) is greater than estimated manifold pressure ($\hat{p}_m$). When the answer to step 316 is YES, current estimated brake booster pressure ($\hat{p}_{bb}^i$) is set equal to the estimated manifold pressure ($\hat{p}_m$) minus predetermined value H as represented by step 318. Predetermined value H represents the pressure drop across check valve 134. Otherwise, in step 320, the current estimated brake booster pressure ($\hat{p}_{bb}^i$) is set equal to the temporary estimated brake booster pressure ($\hat{p}_{bb}^t$). Thus, according to the present invention, it is possible to estimate brake booster pressure using other operating parameters.

According to the present invention, the estimated brake booster pressure described above can be used for engine and vehicle control. For example, estimated brake booster pressure can be used to determine a desired combustion mode. In particular, estimated brake booster pressure can be used to disable lean or stratified combustion when estimated brake booster pressure is greater than a predetermined pressure value.

Those skilled in the art will recognize, in view of this disclosure, that the methods for estimating brake booster pressure can also be used to improve measurements of brake booster pressure. Thus, improved accuracy can be obtained.

Estimating Other Parameters From Brake Booster Pressure

The following figures describe methods according to the present invention for estimating parameters based on brake booster pressure.

Figure 4:
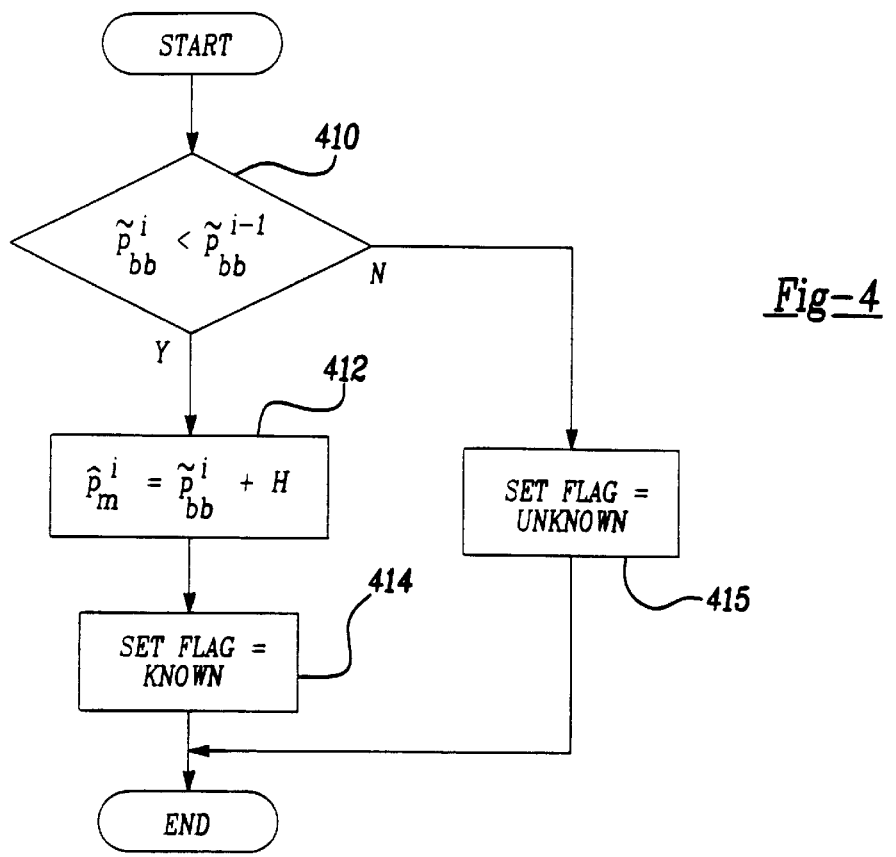

Referring now to FIG. 4, a routine is described for estimating manifold pressure based on brake booster pressure. First, in step 410, a determination is made as to whether measured brake booster pressure ($\tilde{p}_{bb}$) is decreasing. In a preferred embodiment, this is performed by comparing successive measurements of brake booster pressure to one another. When it is determined that brake booster pressure is decreasing, the routine continues to step 412. In step 412, manifold pressure is estimated based on measured brake booster pressure ($\tilde{p}_{bb}$) and predetermined value H. Predetermined value H represents pressure drop across check valve 134. Next, in step 412, a flag is set to KNOWN. Otherwise, the routine continues to step 415, where the flag is set to UNKNOWN. In other words, estimated manifold pressure ($\hat{p}_m$) can be determined from the brake booster pressure whenever the measured brake booster pressure is decreasing. Those skilled in the art will recognize various other methods of determining if brake booster pressure is decreasing. For example, various different filtering techniques can be used such as high pass filtering and low pass filtering. Also, limit values can be used to determine when brake booster pressure is decreasing greater than a predetermined value, and only inferring manifold pressure from brake booster pressure when it is decreasing greater than this predetermined value. Those skilled in the art will recognized various methods of determining whether a parameter is decreasing, or decreasing by a predetermined amount, or decreasing at a predetermined rate.

Referring now to FIG. 5, a routine is described for estimating manifold pressure based on measured brake booster pressure as well as other parameters. First, in step 510, a determination is made as to whether the flag equals KNOWN. When the answer to step 510 is NO, value L is set equal to zero in step 512. Otherwise, in step 514, value L is determined as a function of measured brake booster pressure ($\tilde{p}_{bb}$) and a previously estimated manifold pressure ($\hat{p}_m^{i-1}$)

as well as value H. Then, in step 516, the current estimated manifold pressure ($\hat{p}_m^i$) is based on previous estimated manifold pressure ($\hat{p}_m^{i-1}$) as well as measured mass airflow ($\tilde{m}_{air}$) and engine speed ($\tilde{N}$) and value L. Thus, according to the present invention, it is possible to estimate manifold pressure using other parameters such as mass airflow and engine speed, and then correct this estimate based on measured brake booster pressure whenever brake booster pressure is decreasing. An advantage of this aspect of the present invention is that it is possible to accurately estimate manifold pressure even when brake booster pressure is not decreasing. Also, parameters A and B are system parameters which represent the system dynamics and input dynamics as is known to those skilled in the art. Also, value L can be learned in memory as a function of engine speed and engine load. Again, value L represents the error between the estimate using other variables and the estimate using the brake booster pressure. Value L also represents what is known to those skilled in the art as an observer structure. Also, function $f$ can be a simple gain, or the sign function, or many other functions known to those skilled in the art of estimators, observers, and modern estimation theory.

In an alternative embodiment, where manifold pressure is estimated based on measured mass airflow and engine speed, this estimate can be clipped so that it does not go below measured brake booster pressure. Also, this value that is clipped can be learned and stored in memory and then can be used everywhere to correct the estimated manifold pressure. In other words, whenever the estimated manifold pressure reads less than the measured brake booster pressure, the error between the two is learned and used to correct the estimated manifold pressure over the entire operating range.

Figure 6:
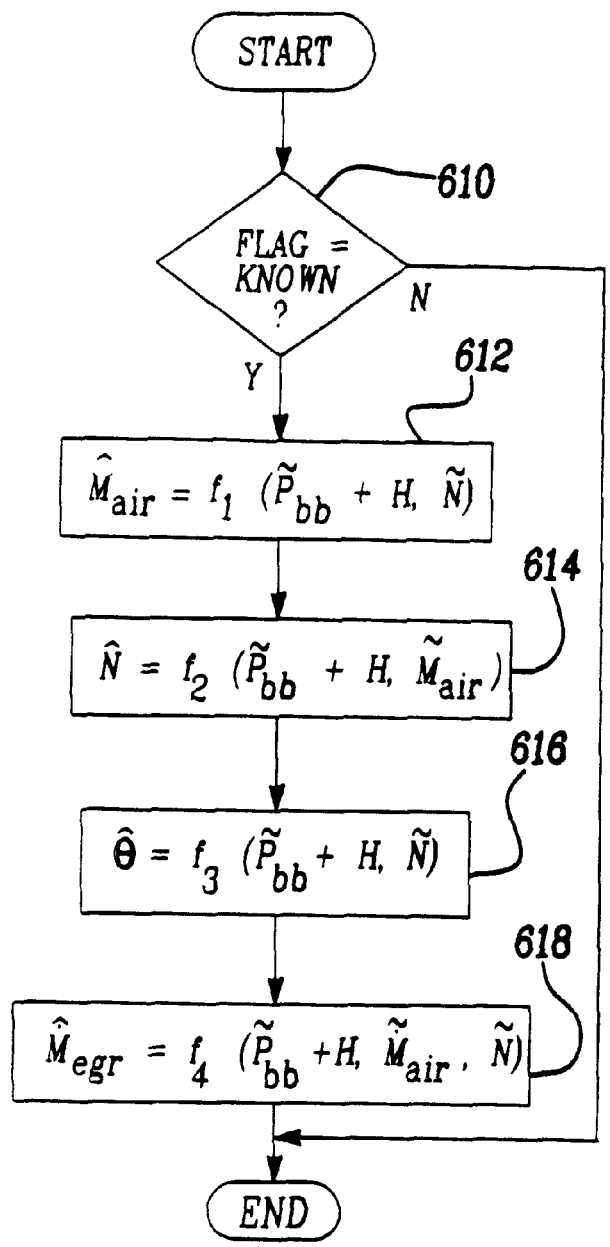

Referring now to FIG. 6, a routine is described for estimating other engine operating parameters based on measured brake booster pressure ($\tilde{p}_{bb}$). First, in step 610, a determination is made as to whether a flag equals KNOWN. If the answer to step 610 is YES, the routine continues to step 612, where engine mass airflow is estimated based on measured brake booster pressure ($\tilde{p}_{bb}$) and measured engine speed ($\tilde{N}$). In step 614, engine speed is estimated based on measured brake booster pressure ($\tilde{p}_{bb}$) and measured mass airflow ($\tilde{m}_{air}$). In step 616, throttle position is estimated based on measured brake booster ($\tilde{p}_{bb}$) pressure and engine speed ($\tilde{N}$). In step 618, EGR flow is estimated based on measured brake booster pressure ($\tilde{p}_{bb}$), measured mass airflow ($\tilde{m}_{air}$), and measured engine speed ($\tilde{N}$). Those skilled in the art will recognize various other combinations, equations and approaches for estimating engine operating parameters based on measured brake booster pressure in view of the present invention. For example, in step 616, measured mass airflow ($\tilde{m}_{air}$) can also be used to improve the throttle position estimate ($\hat{\theta}_t$).

Figure 7A:
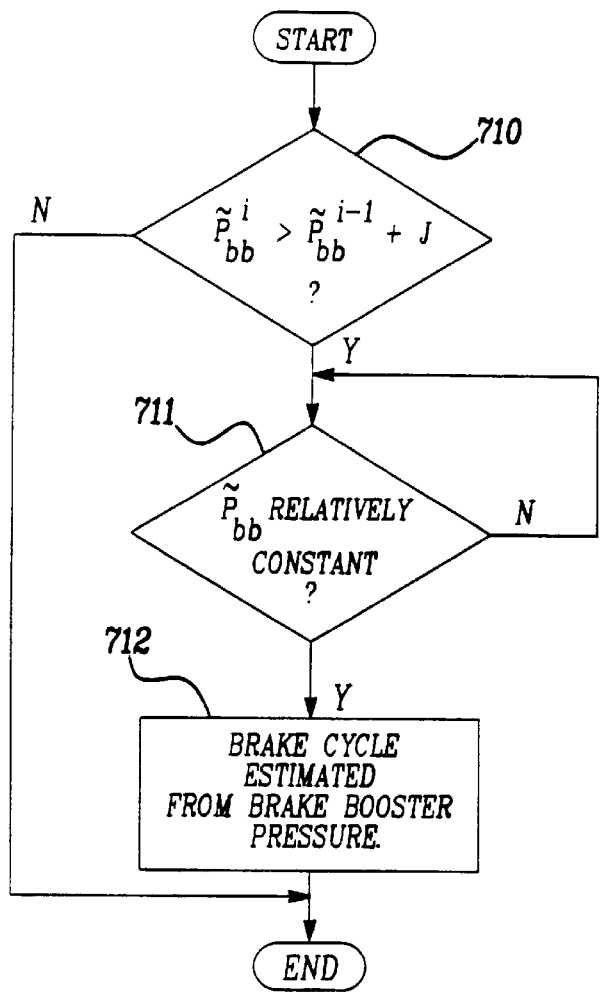

FIG. 7A estimates brake system parameters from brake booster pressure. In other words, when a braking cycle is estimated, it is possible to determine a predicted brake pedal position profile, or a predicted hydraulic brake pressure profile. For example, when a braking cycle is estimated, it is possible to determine that the brake pedal has been depressed by a first predetermined amount and has also been released by a second predetermined amount. Similarly, it is possible to determine that the hydraulic brake pressure reached a first predetermined amount and has also been released by a second predetermined amount.

Referring now to FIG. 7A, in step 710, a determination is made as to whether measured brake booster pressure is increasing. In this particular example, brake booster pressure is increasing when it is greater than a previously measured brake booster pressure and a predetermined value J. However, those skilled in the art will recognize various other methods for determining whether brake booster pressure is increasing such as, for example, high pass filtering brake booster pressure, comparing the rate of change of brake booster pressure to a limit value rate of change, and various other methods. When the answer to step 710 is YES, a determination is made as to whether measured brake booster pressure ($\tilde{p}_{bb}$) is relatively constant indicating that the brake actuation is completed. When the answer to step 711 is YES, the routine determines that a braking cycle has been completed in step 712. In other words, the routine determines brake system operation based on increasing brake booster pressure. Therefore, it is possible to determine whether a braking cycle should have been estimated from other braking system parameters such as, for example, brake pedal position or hydraulic brake pressure.

According to the present invention, the estimated operating parameters described above herein can be used for engine and vehicle control. For example, estimated manifold pressure or mass airflow can be used to determine desired fuel injection amounts, fuel injection timings, combustion modes ignition timings, exhaust gas recirculation amounts, and other engine control parameters. For example, to maintain a desired air/fuel ratio, a fuel injection amount can be adjusted based on estimated airflow or manifold pressure based on the measured brake booster pressure.

Figure 7B:
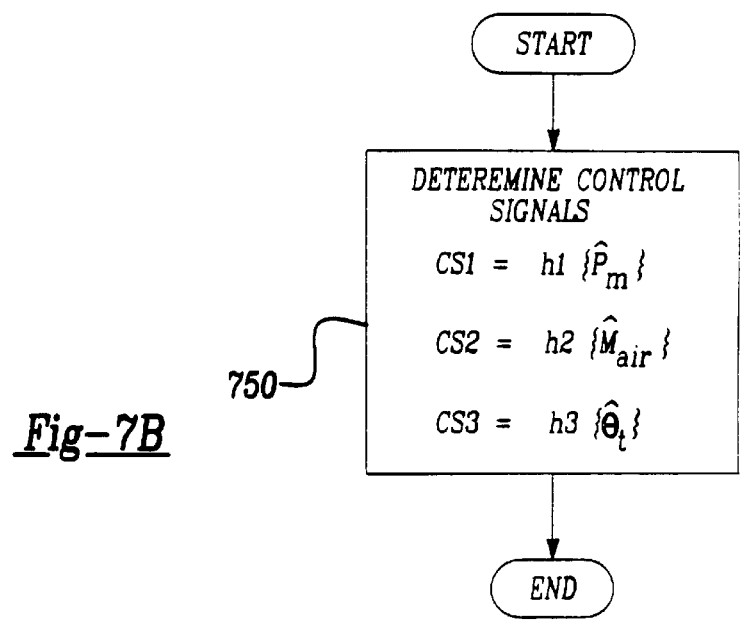

Referring now to FIG. 7B, a routine is described for calculating control signals based on estimated parameters, where the estimated parameters are based on measured brake booster pressure. In step 750, control signals CS1, CS2, and CS3 are calculated using functions h1, h2, and h3 and estimated parameters, $\hat{p}_m$, $\hat{m}_{air}$, and $\hat{\theta}_t$. Control signals CS1, CS2, and CS3 can represent: a desired fuel injection amount, a desired ignition timing amount, a desired fuel injection timing, a desired throttle position, or any other control signal known to those skilled in the art which may benefit from information regarding manifold pressure, mass airflow, and/or throttle position.

Determining Degradation of Brake Booster Pressure Sensor

The following figures describe various methods that can be used alone or in combination to determine degradation of brake booster pressure sensor 142.

Figure 8:
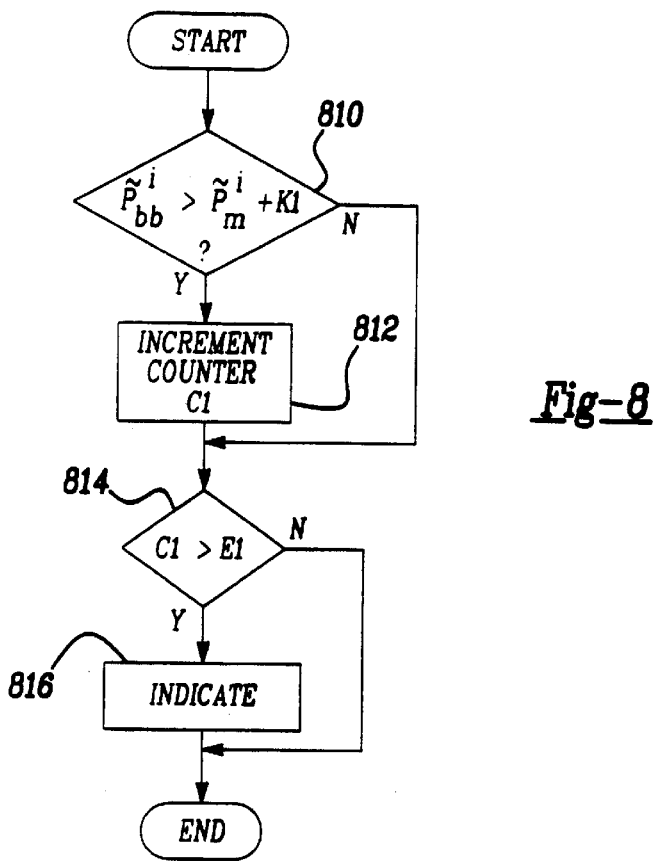

Referring now to FIG. 8, a routine is described for determining degradation of brake booster pressure sensor 142 based on measured manifold pressure. The routine assumes that a check valve is properly operating. First, in step 810, a determination is made as to whether measured brake booster pressure is greater than the sum of measured manifold pressure and predetermined value K1. Value K1 represents the maximum amount of pressure drop across a properly functioning check valve. When the answer to step 810 is YES, counter C1 is incremented in step 812. Next, in step 814, a determination is made as to whether counter C1 is greater than limit value E1. When the answer to step 814 is YES, an indication is created in step 814 to indicate possible degradation of sensor 142. Thus, according to the present invention, it is possible to determine degradation of brake booster pressure sensor based on measured manifold pressure. In other words, since check valve 134 only allows brake booster pressure to be less than manifold pressure, degradation is determined when measured brake booster pressure is greater than an allowable maximum level based on manifold pressure. Thus, according to the present invention, degradation in measured brake booster pressure can be accurately determined.

Figure 9:
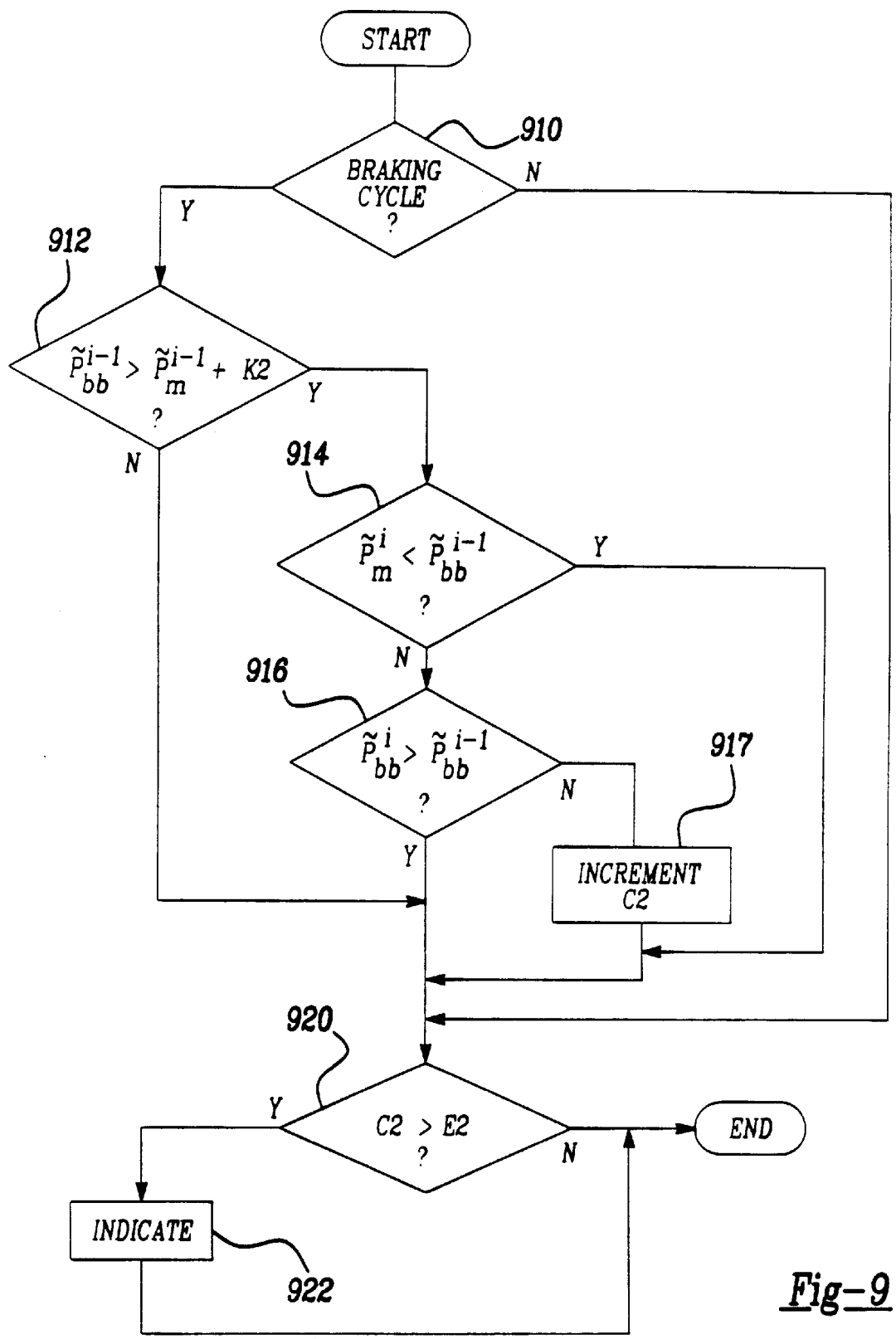

Referring now to FIG. 9, a routine for determining degradation in brake booster pressure sensor 142 based on an indicated brake cycle is described. First, in step 910, a determination is made as to whether a braking cycle has been determined. Braking cycle is determined as described previously herein with reference to step 210. Next, when the answer to step 910 is YES, a determination is made as to whether previously measured brake booster pressure is less than previously measured manifold pressure plus predetermined value K2. In other words, a determination is made as to whether it would be possible or likely for the brake booster pressure to increase by a measurable amount knowing the previously measured manifold pressure if the brakes were cycled between the current measurement and the previous measurement. If it is not possible or unlikely for the brake booster pressure to increase due to a braking cycle because of low manifold pressure and check valve 134, then the answer to step 912 is NO. Otherwise, the answer to step 912 is YES, and a determination is made in step 914 as to whether the current measured manifold pressure is less than the previously measured brake booster pressure. In other words, a determination is made as to whether the current measured manifold pressure has decreased below the previously measured brake booster pressure indicating that it is not desirable to determine braking cycles from measured brake booster pressure. Thus, when the answer to step 914 is NO, the routine continues to step 916 to determine whether measured brake booster pressure has increased. In other words, in step 916, conditions are such that a braking cycle should have caused brake booster pressure to increase since brake booster pressure is below manifold pressure. When brake booster pressure is not increasing, the routine continues to step 917 to increment counter C2. Next, in step 920, a determination is made as to whether counter C2 is greater than limit E2. When the answer to step 920 is YES, an indication is provided in step 922. Thus, according to the present invention, it is possible to determine degradation in measured brake booster pressure sensor 142 based on measured manifold pressure and a determination of brake cycling. Those skilled in the art will recognize that measured manifold pressure can be replaced in this routine by estimated manifold pressure from sensors such as, for example, engine speed and mass airflow. Thus, according to the present invention, degradation in measured brake booster pressure is determined when brake booster pressure does not approach manifold pressure when measured brake booster pressure is less than measured manifold pressure.

Figure 10:
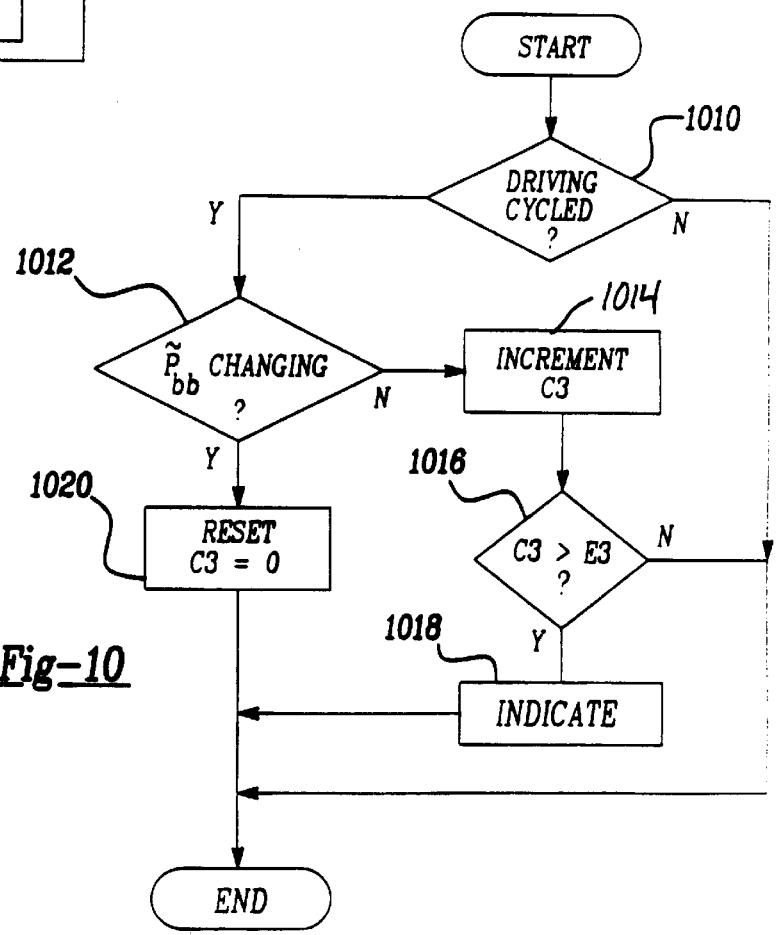

Referring now to FIG. 10, a routine is described for determining degradation in brake booster pressure sensor 142 based on vehicle operation. First, in step 1010, a determination is made as to whether the vehicle has been driven, in other words, whether the vehicle has been started and driven over a predetermined speed or more than a predetermined distance. When the answer to step 1010 is YES, a determination is made in step 1012 as to whether measured brake booster pressure is changing. This can be done by determining whether measured brake booster pressure changes by a predetermined amount. This predetermined amount reduces or prevents the possibility of regular sensor noise and variation falsely indicating that measured brake booster pressure is properly changing. When the answer to step 1012 is NO, counter C3 is incremented in step 1014. Next, in step 1016, a determination is made as to whether counter C3 is greater than limit value E3. When the answer to step 1016 is YES, an indication is provided in step 1018. Continuing with FIG. 10, when the answer to step 1012 is YES, counter C4 is reset to zero in step 1020. Thus, according to the present invention, it is possible to determine degradation and measured brake booster pressure knowing that brake booster pressure should change if the vehicle has been driven. Therefore, it is also possible to detect in-range sensor degradation.

Figure 11:
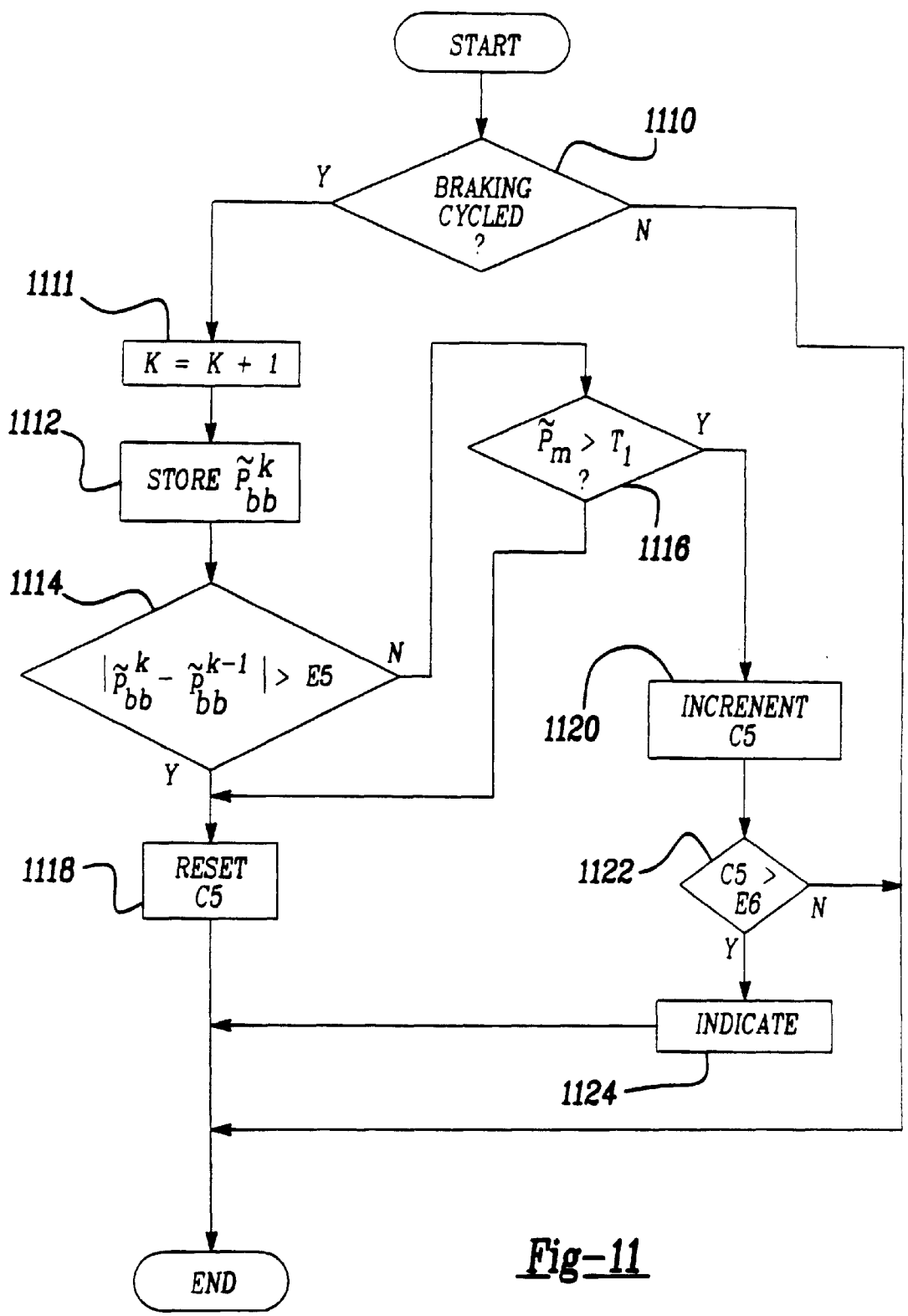

Referring now to FIG. 11, a routine is described for determining degradation in brake booster pressure sensor 142 based on braking operation. First, in step 1110, a determination is made as to whether a braking cycle has been detected as described previously herein with respect to step 210. When the answer to step 1110 is YES, braking cycle parameter k is incremented and the measured brake booster pressure at this step is stored as represented in steps 1111 and 1112. Then, in step 1114, a determination is made as to whether the absolute value of the difference between successive measurements of measured brake booster pressure after brake cycling is greater than value E5. When the answer to step 1114 is NO, the routine continues to step 1116. In step 1116, a determination is made as to whether measured manifold pressure is greater than value T1. When the answer to step 1116 is NO, the routine continues to step 1118 where counter C5 is reset. Otherwise, in step 1120, counter C5 is incremented and determined whether it is greater than limit value E6 in step 1122. When the answer to step 1122 is YES, an indication is provided in step 1124. In other words, if brake booster pressure is not changing even after actuation of the brakes when manifold pressure is greater than a value T1, degradation is detected.

Figure 12:
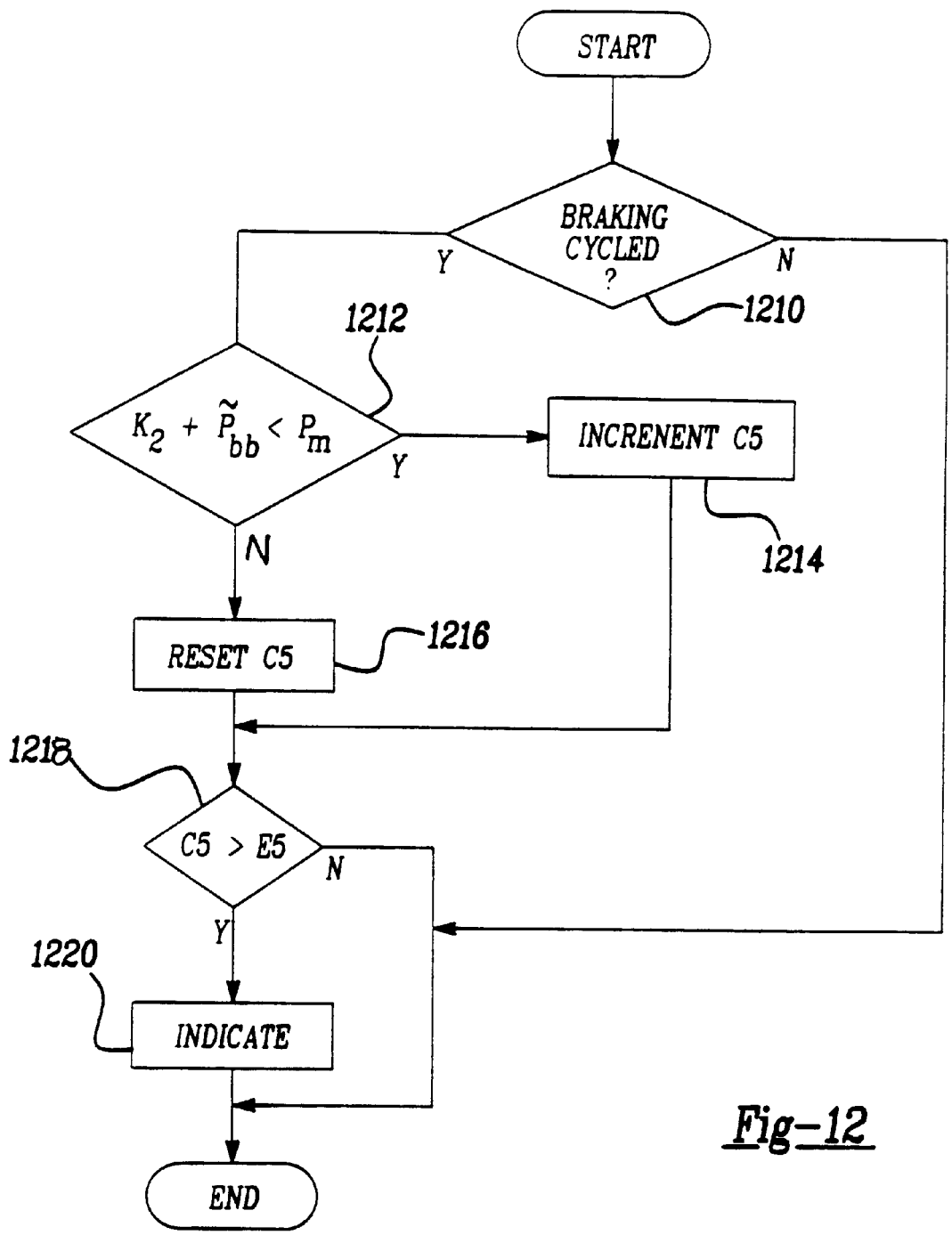

Referring now to FIG. 12, a routine is described for determining degradation in measured brake booster pressure based on braking cycles. First, in step 1210, a determination is made as to whether a braking cycle has been completed as described previously herein with respect to FIG. 2 in step 210. When the answer to step 1210 is YES, a determination is made as to whether measured brake booster pressure plus a predetermined value K2 is less than manifold pressure. Those skilled in the art will recognize that manifold pressure can be measured from a manifold pressure sensor or estimated using parameters such as engine speed and mass airflow. Alternatively, throttle position and engine speed can be used. In other words, in step 1212, a determination is made as to whether a brake cycling should cause brake booster pressure to approach manifold pressure. When the answer to step 1212 is NO, counter C5 is reset in step 1216. Otherwise, in step 1214, counter C5 is incremented. Then, in step 1218, a determination is made as to whether counter C5 is greater than limit value E5. When the answer to step 1218 is YES, an indication is provided in step 1220. Thus, according to the present invention, degradation in measured brake booster pressure is determined when brake booster pressure does not approach manifold pressure after a predetermined number of braking cycles. Thus, value K2 represents a maximum amount of pressure drop across check valve 134 or a maximum amount of measurement error in both determining manifold pressure and brake booster pressure that can be tolerated.

Determining Degradation of Other Sensors from Measured Brake Booster Pressure

The following figures describe various methods that can be used alone or in combination to determine degradation of operating parameter sensors based on measured brake booster pressure.

Figure 13:
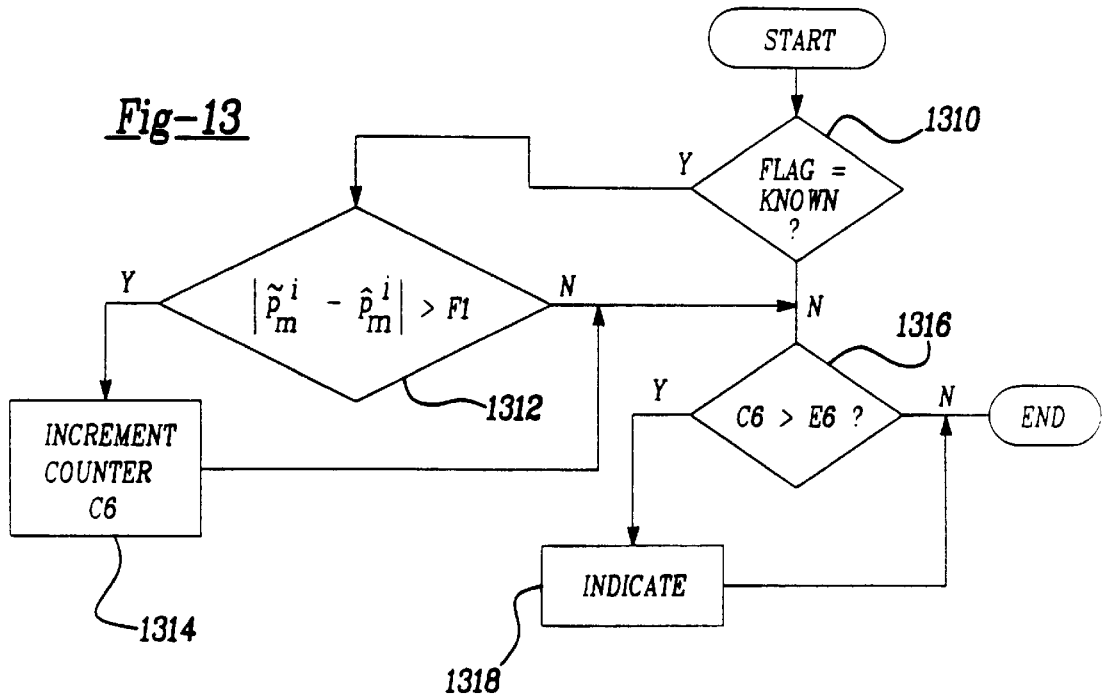

Referring now to FIG. 13, a routine is described for determining degradation of manifold pressure sensor 122 based on measured brake booster pressure. First, in step 1310, a determination is made as to whether flag equals KNOWN. When the answer to step 1310 is YES, the routine continues to step 1312 where a determination is made as to whether the absolute value of the difference between measured manifold pressure and estimated manifold pressure from either step 412 or step 516 is greater than maximum air value F1. When the answer to step 1312 is YES, counter C6 is incremented in step 1314. Continuing with FIG. 13, in step 1316, a determination is made as to whether counter C6 is greater than limit value E6. When the answer to step 1316 is YES, an indication is provided in step 1318. Thus, according to the present invention, it is possible to determine degradation of manifold pressure sensor 122 based on brake booster pressure sensor 142. In particular, even without estimating manifold pressure from measured mass airflow and engine speed or measured throttle position and engine speed, it is still possible to determine degradation of pressure sensor 122 by using measured brake booster pressure whenever measured brake booster pressure is decreasing.

Figure 14:
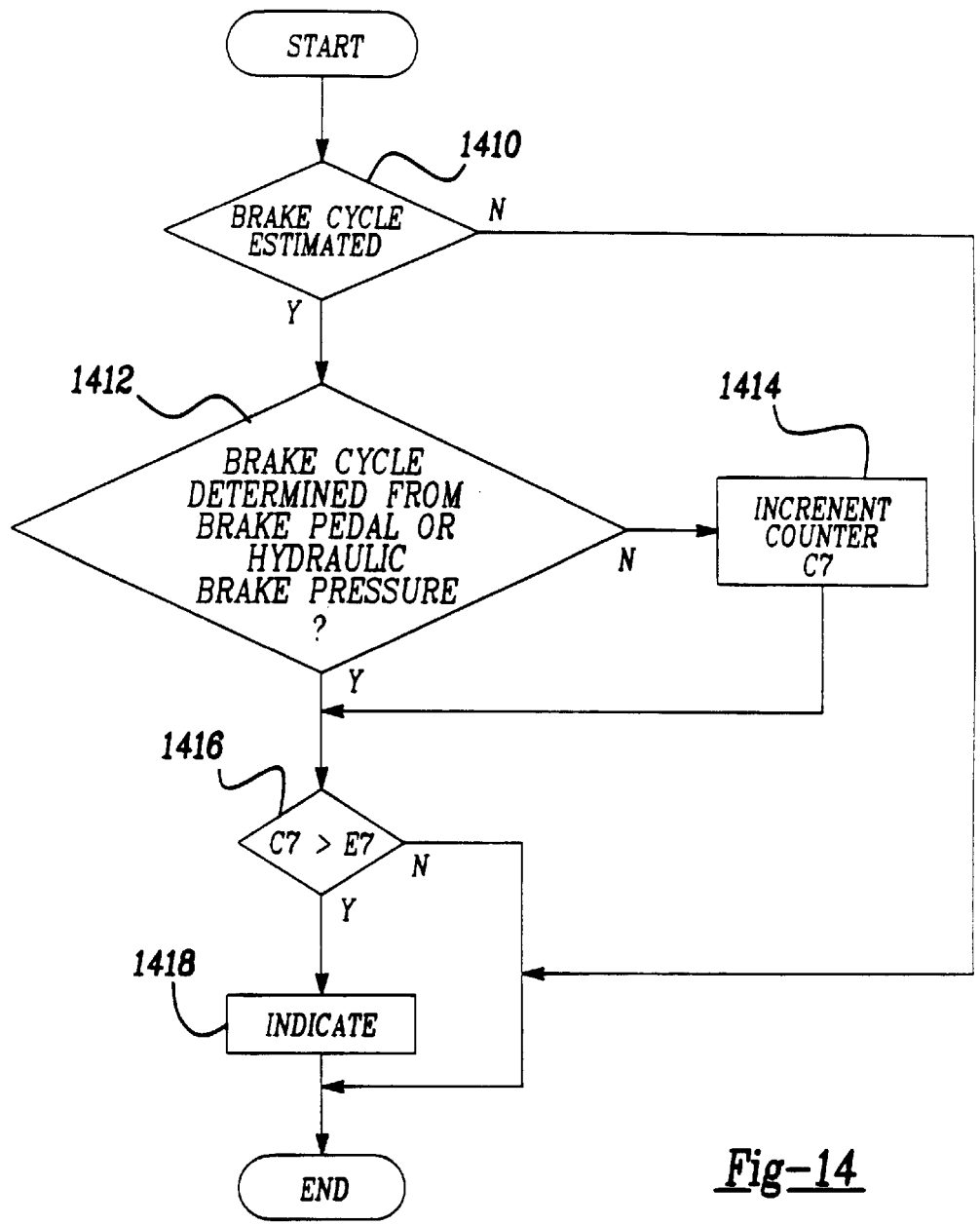

Referring now to FIG. 14, a routine is described for determining degradation in either brake pedal sensor or hydraulic brake pressure sensor using estimated brake cycling as described previously herein with respect to FIGS. 7A and 7B. First, in step 1410, a determination is made as to whether a brake cycle has been estimated as described previously herein with respect to FIG. 7A. When the answer to step 1410 is YES, the routine continues to step 1412. In step 1412, a determination is made as to whether brake cycle has been determined from either brake pedal actuation or hydraulic brake pressure measurement as described previously herein with respect FIG. 2. When the answer to step 1412 is NO, counter C7 is incremented in step 1414. Next, in step 1416, a determination is made as to whether counter C7 is greater than limit value E7. When the answer to step 1416 is YES, an indication is provided in step 1418. Thus, according to the present invention, it is possible to determine degradation in brake system sensors, such as brake pedal position or hydraulic brake pressure, based on measured brake booster pressure.

Figure 15:
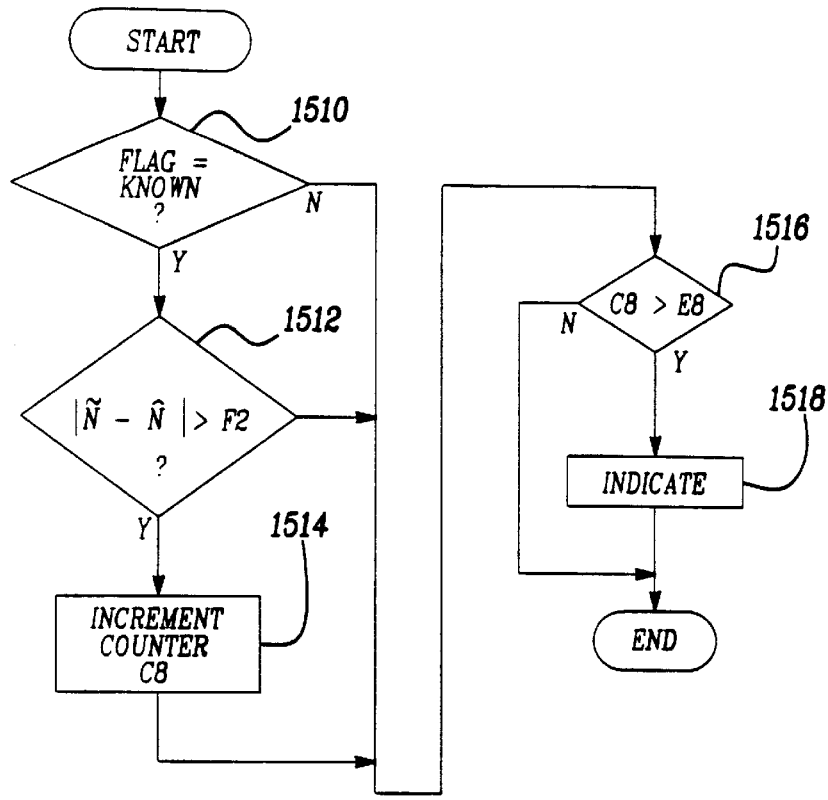

Referring now to FIG. 15, a routine is described for determining degradation in measured engine speed based on measured brake booster pressure. First, in step 1510, a determination is made as to whether a flag equals KNOWN. When the answer to step 1510 is YES, then, as described previously herein, it is possible to estimate engine speed from measured brake booster pressure and other operating parameters. When the answer to step 1510 is YES, the routine continues to step 1512, where the absolute value of the difference between measured engine speed and estimated engine speed determined from step 614 is greater than the maximum difference value F2. When the answer to step 1512 is YES, the routine continues to step 1514 and increments counter C8. Next, in step 1516, a determination is made as to whether counter C8 is greater than limit value E8. When the answer to step 1516 is YES, an indication is provided in step 1518. Thus, according to the present invention, engine speed estimated from brake booster pressure whenever brake booster pressure is decreasing is used along with measured mass airflow to determine degradation in engine speed sensing.

Figure 16:
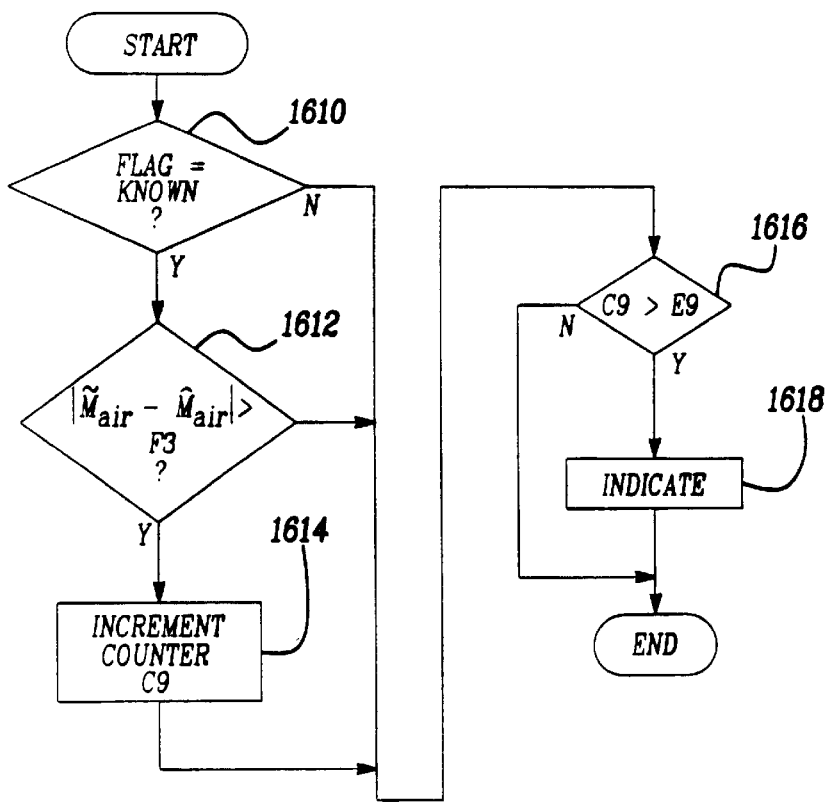

Referring now to FIG. 16, a routine is described for determining degradation in measured mass airflow based on measured brake booster pressure. First, in step 1610, a determination is made as to whether a flag equals KNOWN. When the answer to step 1610 is YES, then, as described previously herein, it is possible to estimate mass airflow from measured brake booster pressure and other operating parameters. When the answer to step 1610 is YES, the routine continues to step 1612, where the absolute value of the difference between measured mass airflow and estimated mass airflow determined from step 612 is greater than the maximum difference value F3. When the answer to step 1612 is YES, the routine continues to step 1614 and increments counter C9. Next, in step 1616, a determination is made as to whether counter C9 is greater than limit value E9. When the answer to step 1616 is YES, an indication is provided in step 1618. Thus, according to the present invention, mass airflow estimated from brake booster pressure whenever brake booster pressure is decreasing is used along with measured engine speed to determine degradation in mass airflow sensing.

Figure 17:
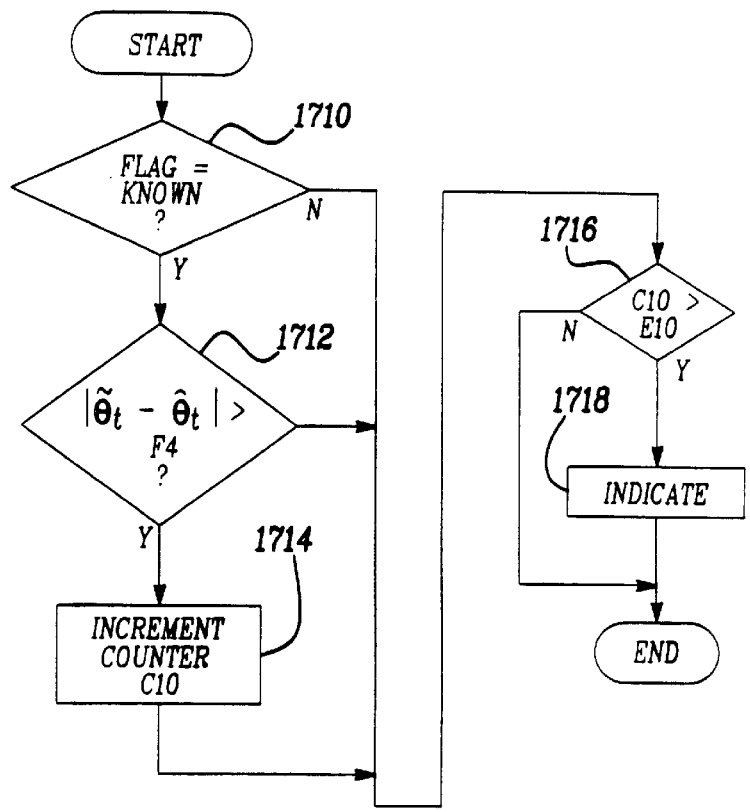

Referring now to FIG. 17, a routine is described for determining degradation in throttle position based on measured brake booster pressure. First, in step 1710, a determination is made as to whether a flag equals KNOWN. When the answer to step 1710 is YES, then, as described previously herein, it is possible to estimate throttle position from measured brake booster pressure and other operating parameters. When the answer to step 1710 is YES, the routine continues to step 1712, where the absolute value of the difference between measured mass airflow and estimated throttle position determined from step 616 is greater than the maximum difference value F4. When the answer to step 1712 is YES, the routine continues to step 1714 and increments counter C10. Next, in step 1716, a determination is made as to whether counter C10 is greater than limit value E10. When the answer to step 1716 is YES, an indication is provided in step 1718. Thus, according to the present invention, throttle position estimated from brake booster pressure whenever brake booster pressure is decreasing is used along with measured engine speed to determine degradation in throttle position sensing.

Figure 18:
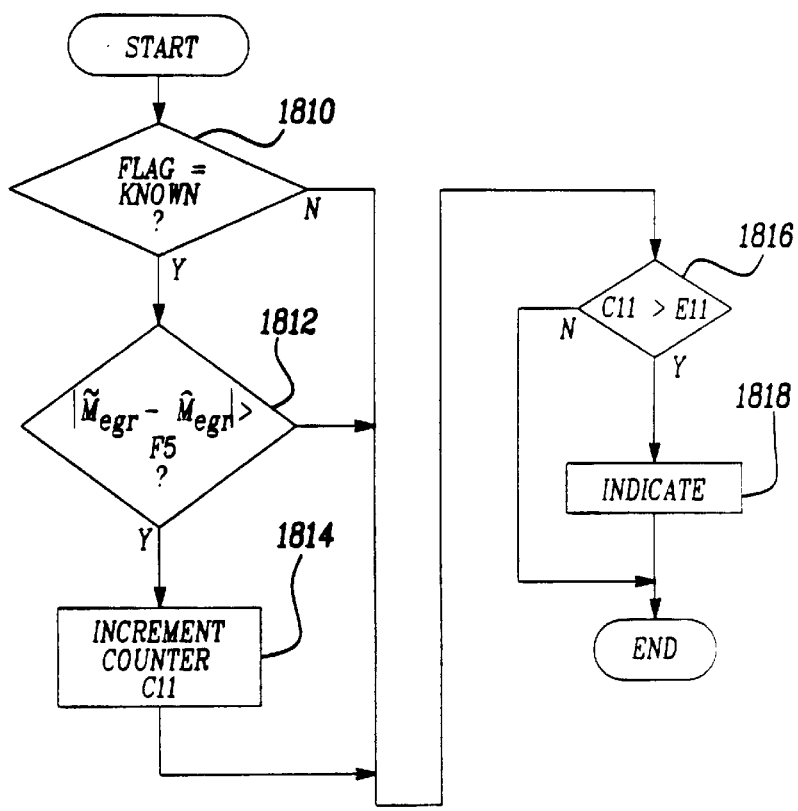

Referring now to FIG. 18, a routine is described for determining degradation in exhaust gas recirculation flow sensing based on measured brake booster pressure. First, in step 1810, a determination is made as to whether a flag equals KNOWN. When the answer to step 1810 is YES, then, as described previously herein, it is possible to estimate exhaust gas recirculation flow from measured brake booster pressure and other operating parameters. When the answer to step 1810 is YES, the routine continues to step 1812, where the absolute value of the difference between measured exhaust gas recirculation flow and estimated exhaust gas recirculation flow determined from step 618 is greater than the maximum difference value F5. When the answer to step 1812 is YES, the routine continues to step 1814 and increments counter C11. Next, in step 1816, a determination is made as to whether counter C11 is greater than limit value E11. When the answer to step 1816 is YES, an indication is provided in step 1818. Thus, according to the present invention, exhaust gas recirculation flow estimated from brake booster pressure whenever brake booster pressure is decreasing is used along with measured mass airflow and measured engine speed to determine degradation in exhaust gas recirculation flow sensing.

Figure 19:
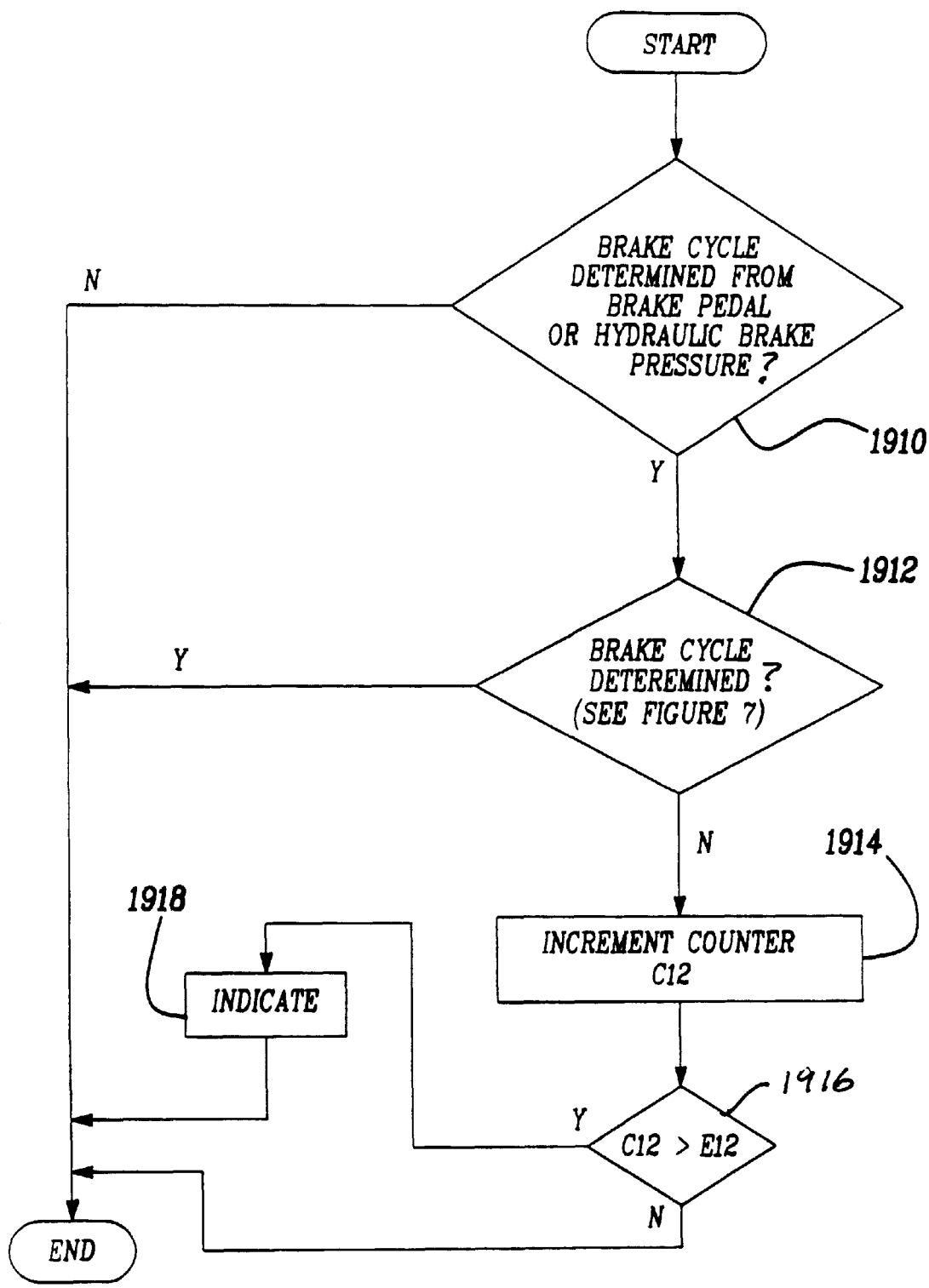

Referring now to FIG. 19, a routine for determine degradation in either brake pedal position sensor 140 or hydraulic brake pressure 144 is described. First, in step 1910, a determination is made as to whether a brake cycle has been determine from the brake pedal or hydraulic brake pressure as described previously herein with respect to step 210. When the answer to step 1910 is YES, a determine is made in step 1912 as to whether a braking cycle has been estimated from measured brake booster pressure as previously described herein with respect to FIG. 7A. When the answer to step 1912 is NO, counter C12 is incremented in step 1914. Next, in step 1916, a determination is made as to whether counter C12 is greater than limit value E12. When the answer to step 1916 is YES, an indication is provided in step 1918. Thus, according to the present invention, it is possible to detect degradation in either brake pedal position sensor 140 or hydraulic brake pressure sensor from measured brake booster pressure 144.

Examples of Operation

The following figures describe graphs showing examples of operation according to the present invention as described above herein.

Figure 20:
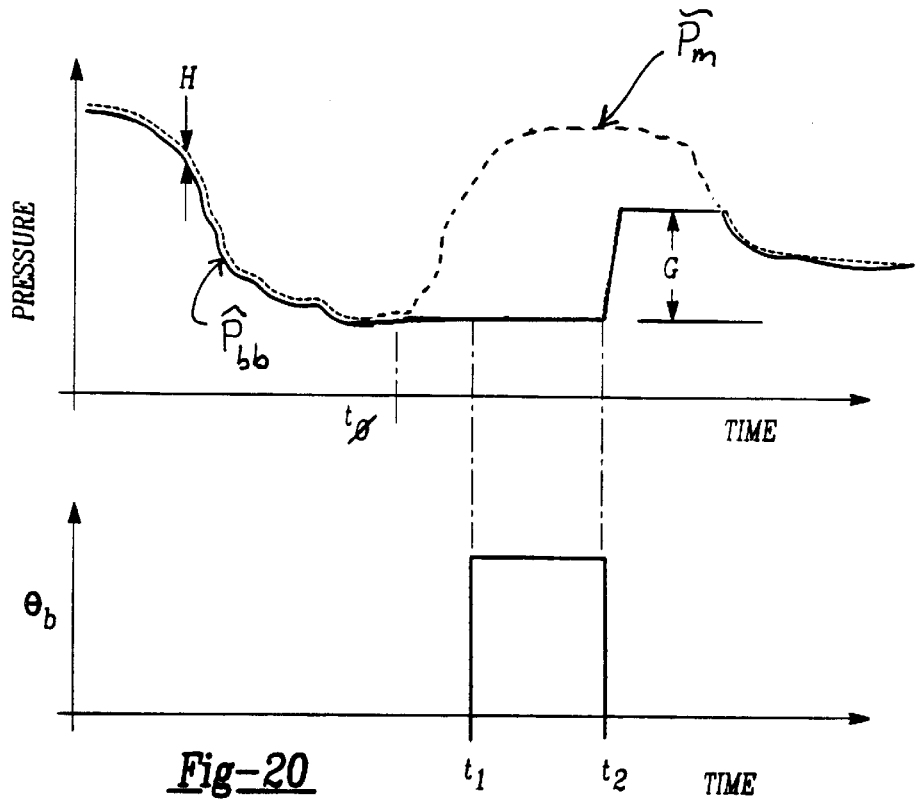

In FIG. 20, measured manifold pressure is shown with the estimated brake booster pressure under normal operating conditions. The pressure drop across the check valve H is indicated as well as the increase in pressure due to predetermined value G. Before time t0, brake booster pressure is estimate directly from manifold pressure and H since manifold pressure is decreasing. Then, at time t1, the brakes are actuated. Then, at time t2, the brakes are released and it is determined that the brakes have been cycled and a predetermined value G is used to represent the vacuum (or pressure) used by the brake booster.

Figure 21:
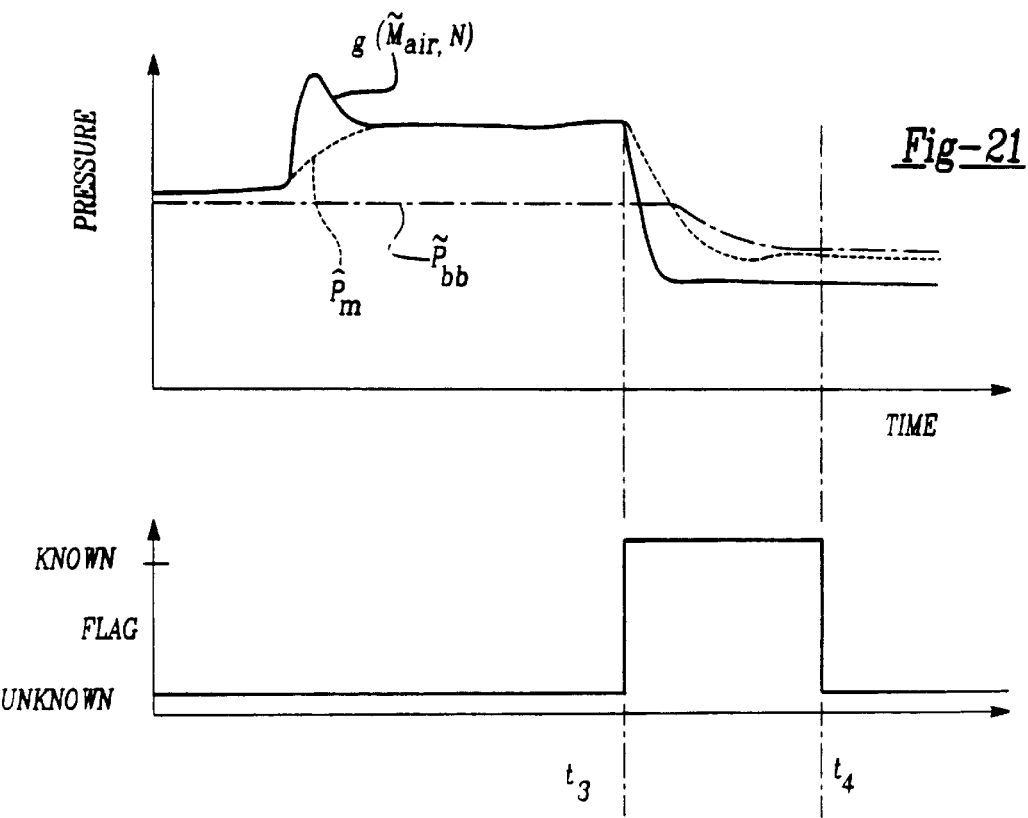

In FIG. 21, estimated manifold pressure is shown using information from both measured airflow and engine speed, and from measured brake booster pressure. Before time t3, manifold pressure is estimated from airflow and engine speed. Then, from time t3 to t4, where the flag is set to KNOWN, mass airflow, engine speed and measured brake booster pressure are used. As shown, the estimate from airflow and engine is corrected during this time to improve the accuracy of estimated manifold pressure. Then, after time t4, only airflow and engine are again used.

Figure 22:
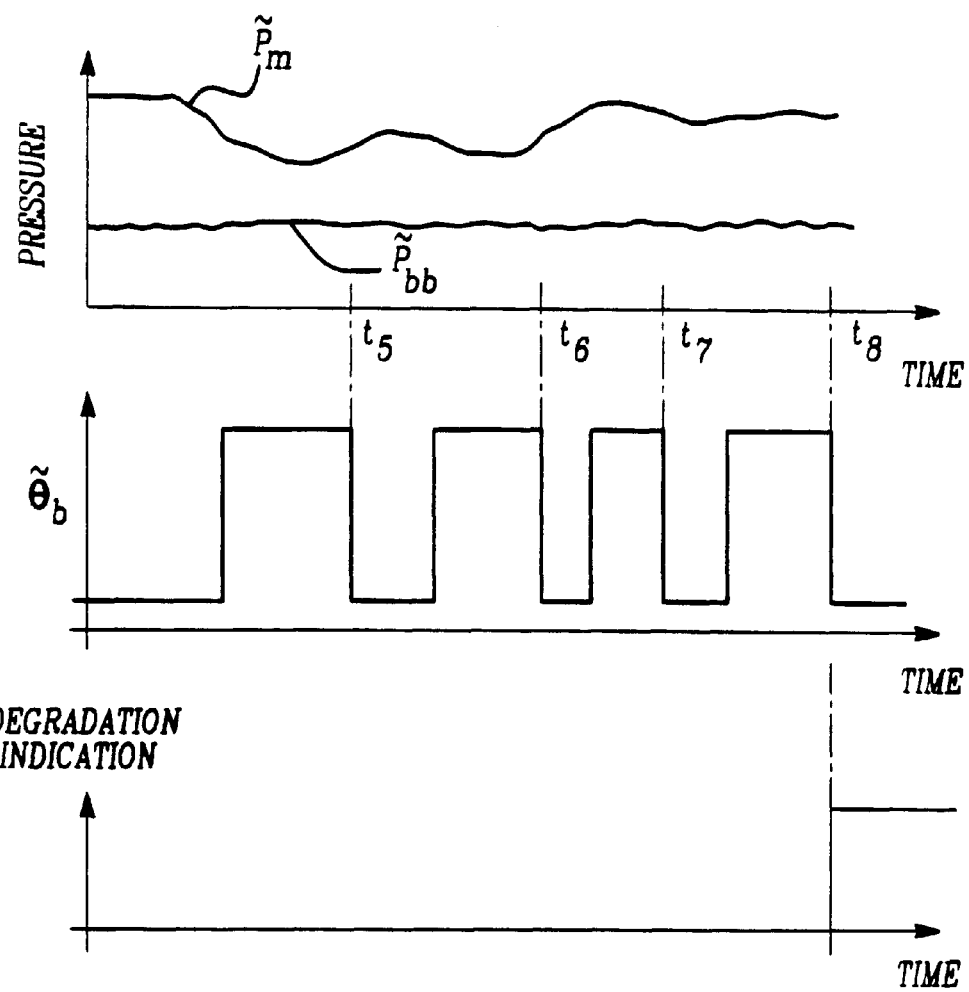

In FIG. 22, degradation of measured brake booster pressure is described. At times t5, t6, t7, and t8, a braking cycle is completed as indicated from brake pedal 140. As shown, measured brake booster pressure does not increase during any of these braking cycles even though manifold pressure is greater than the measured brake booster pressure. Thus, during each of these times, a counter increments. At time t8, the counter has reached the calibrated level and an indication of degradation is provided.

This concludes a description of an example in which the invention is used to advantage. Those skilled in the art will recognize that many modifications may be practiced without departing from the spirit and scope of the invention. For example, the present invention can be used as a supplement to existing methods for estimating operating parameters and/or determining degradation. Also, the methods are not limited to gasoline engines, but can be used with diesel engines, alternatively fueled engines, or hybrid powertrains. Accordingly, it is intended that the invention be limited only by the following claims.

What is claimed:

1. A method for detecting degradation of a sensor in a vacuum brake booster coupled to a manifold of an internal combustion engine, the method comprising:
   measuring an engine or vehicle operating parameter to detect operating or control conditions;
   detecting degradation of the sensor based on the engine or vehicle operating parameter, wherein the engine or vehicle operating parameter is indicative of manifold pressure and wherein the step of detecting comprises detecting degradation when the brake booster sensor indicates a pressure greater than indicated manifold pressure.

2. The method of claim 1 wherein the manifold pressure is measured by a corresponding sensor.

3. The method of claim 1 wherein the manifold pressure is an estimated manifold pressure.

4. A method for detecting degradation of a sensor in a vacuum brake booster coupled to a manifold of a multi-cylinder direct injection internal combustion engine, the method comprising:
   determining manifold pressure;
   determining brake booster pressure based on a signal provided by the sensor;
   detecting degradation of the sensor when the brake booster pressure exceeds the manifold pressure by a predetermined amount.

5. The method of claim 4 wherein the vacuum brake booster is coupled to the manifold via a check valve and wherein the step of detecting degradation comprises detecting degradation when the brake booster pressure exceeds the manifold pressure by an amount corresponding to a pressure drop across the check valve.

6. The method of claim 4 wherein the manifold pressure is measured using a corresponding manifold pressure sensor.

7. The method of claim 4 wherein the manifold pressure is estimated.

8. The method of claim 4 wherein the sensor is a brake booster pressure sensor.

9. The method of claim 4 wherein the step of detecting degradation comprises:
   incrementing a counter when brake booster pressure exceeds manifold pressure; and
   indicating sensor degradation when the counter exceeds a corresponding threshold.

10. A method for monitoring operability of a sensor in a vacuum brake booster, the brake booster coupled to a manifold of an internal combustion engine, the method comprising:
    determining whether vehicle brakes have been actuated;
    determining whether vacuum brake booster pressure increases during activation of the vehicle brakes; and
    providing an indication of degradation of the sensor in the vacuum brake booster if vacuum brake booster pressure increases by less than a predetermined amount.

11. The method of claim 10 further comprising:
    measuring an engine operating parameter;
    measuring a brake system parameter;
    estimating brake booster pressure based on the engine operating parameter and the brake system parameter; and
    indicating sensor degradation when the estimated brake booster pressure differs from a value corresponding to the brake booster sensor by a predetermined amount.

12. The method of claim 10 wherein the step of determining whether the vehicle brakes have been actuated comprises monitoring hydraulic brake pressure.

13. The method of claim 10 wherein the step of determining whether the vehicle brakes have been actuated comprises monitoring a brake pedal sensor.

14. The method of claim 10 wherein the step of determining whether the vehicle brakes have been actuated includes determining vehicle speed and a number of engine starts.

15. The method of claim 10 wherein the step of determining whether the vehicle brakes have been actuated includes determining vehicle speed and a number of vehicle stops.

16. A method for monitoring operability of a sensor in a vacuum brake booster coupled to a manifold of an internal combustion engine, the method comprising:

determining whether vehicle brakes have been actuated;

determining whether vacuum brake booster pressure increases during activation of the vehicle brakes; and providing an indication if vacuum brake booster pressure changes by less than a predetermined amount, wherein the step of providing an indication indicating comprises:

incrementing a counter each time vehicle brakes have been actuated; and indicating sensor degradation when the counter exceeds a corresponding threshold.

17. A method for monitoring operability of a sensor in a vacuum brake booster coupled to a manifold of an internal combustion engine, the method comprising:

determining whether vehicle brakes have been actuated;

determining whether vacuum brake booster pressure increases during activation of the vehicle brakes; and providing an indication if vacuum brake booster pressure changes by less than a predetermined amount, determining manifold pressure; and wherein the step of providing an indication is performed only if the manifold pressure is less than the vacuum brake booster pressure.

18. The method of claim 17 wherein the step of determining manifold pressure comprises determining manifold pressure based on engine speed and mass airflow.

19. The method of claim 17 wherein the step of determining manifold pressure comprises determining manifold pressure based on a corresponding manifold pressure sensor signal.

20. A method for monitoring operability of a sensor in a vacuum brake booster, the brake booster coupled to a manifold of an internal combustion engine in a vehicle, the method comprising:

determining whether the vehicle has been driven;

monitoring changes in vacuum brake booster pressure;

providing an indication of degradation of the sensor in the brake booster when the vehicle has been driven without corresponding changes in vacuum brake booster pressure, wherein the step of providing an indication further comprises determining whether the changes in vacuum brake booster pressure exceed a predetermined amount.

21. The method of claim 20 wherein the step of determining comprises:

determining whether the vehicle has been driven over a predetermined speed after starting.

22. The method of claim 20 wherein the step of determining comprises:

determining whether the vehicle has been driven more than a predetermined distance after starting.

23. A method for monitoring operability of a pressure sensor in a vacuum brake booster coupled to a manifold of an internal combustion engine in a vehicle, the method comprising:

determining whether a braking cycle has been completed;

storing a brake booster pressure based on a signal provided by the pressure sensor each time a braking cycle has been completed;

comparing at least two stored brake booster sensor measurements to determine a difference; and providing an indication when the difference exceeds a corresponding threshold.

24. The method of claim 23 further comprising:

determining whether manifold pressure exceeds a corresponding manifold threshold;

wherein the step of providing an indication is performed only when the manifold pressure exceeds the corresponding manifold threshold.

25. The method of claim 24 further comprising:

incrementing a counter when the difference exceeds the corresponding booster pressure threshold and the manifold pressure exceeds the corresponding manifold threshold;

resetting the counter when the manifold pressure is less than the corresponding manifold threshold; and providing an indication when the counter exceeds a corresponding counter threshold.

* * * * *